H. M. SCHEIBE.
CENTRIFUGAL SWITCH.
APPLICATION FILED JUNE 5, 1913.

1,279,012.

Patented Sept. 17, 1918.

WITNESSES:
G. J. Pidge.
J. R. Langley

INVENTOR
Harold M. Scheibe
BY
Wesley G. Carr
ATTORNEY

UNITED STATES PATENT OFFICE.

HAROLD M. SCHEIBE, OF WILKINSBURG, PENNSYLVANIA, ASSIGNOR TO WESTINGHOUSE ELECTRIC AND MANUFACTURING COMPANY, A CORPORATION OF PENNSYLVANIA.

CENTRIFUGAL SWITCH.

1,279,012.

Specification of Letters Patent.

Patented Sept. 17, 1918.

Application filed June 5, 1913. Serial No. 771,877.

*To all whom it may concern:*

Be it known that I, HAROLD M. SCHEIBE, a citizen of the United States, and a resident of Wilkinsburg, in the county of Allegheny and State of Pennsylvania, have invented a new and useful Improvement in Centrifugal Switches, of which the following is a specification.

My invention relates to centrifugal switches such as are commonly employed in electrical devices in which circuit connections are made and interrupted at predetermined speeds, and it has reference to fan motors of the single-phase induction type and to starting means therefor.

The object of my invention is to provide a device of the character indicated above which is simple and durable in construction and positive and certain in its action under all conditions.

It is customary, in practice, to provide single-phase motors for fan purposes with auxiliary windings of high resistance for starting. It has been proposed, heretofore, to provide a centrifugal switch for controlling the connections of this auxiliary winding but certain defects have, in many cases, rendered these devices ineffective for the purpose. A serious but common defect of such devices is the lack of quick positive action when the predetermined speed is reached and the result is a period of rotation with the contacting parts under slight pressure or intermittent contact during which time arcing takes place to the serious detriment of the contact pieces.

According to my present invention, I provide a construction which insures that the contact members will be separated with a quick positive movement at the predetermined speed and the arcing be thereby reduced to a minimum. When the speed of the motor reaches a predetermined minimum, the switch automatically closes with the same quick movement.

Figure 1:
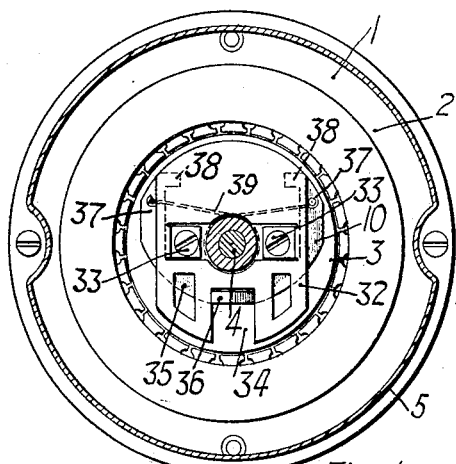
Figure 2:
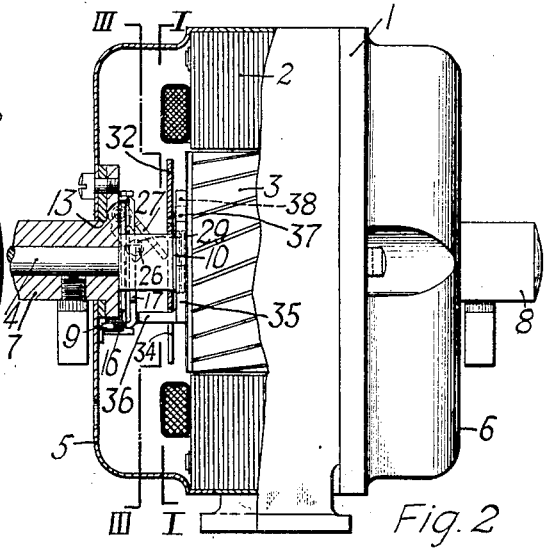
Figure 4:
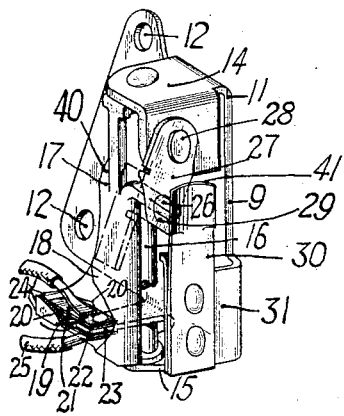
Figure 3:
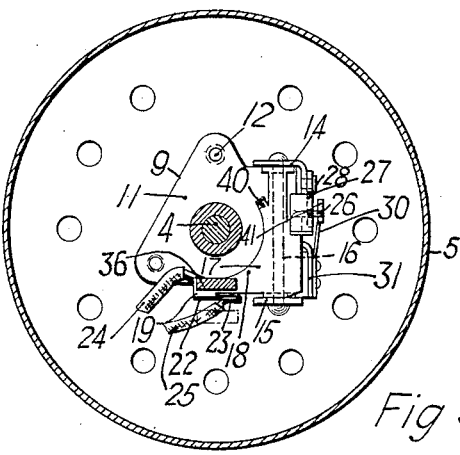
Figures 5, 6:
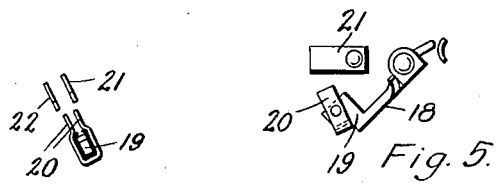

My invention is described in detail in connection with the accompanying drawings in which Figure 1 is a sectional view on line I—I of Fig. 2. Fig. 2 is a side view, partially in elevation and partially in section, of a motor with my invention applied thereto. Fig. 3 is a sectional view on line III—III of Fig. 2. Fig. 4 is a view, in perspective, of the stationary member of the switch, certain parts being broken away, and Figs. 5 and 6 are fragmentary views of the stationary member showing the contact making portions.

My invention is illustrated as applied to a single-phase induction motor 1 which comprises a stator 2, a rotor 3, a rotor shaft 4 and end casings 5 and 6. The shaft 4 is mounted in suitable bearing members 7 and 8 which are attached to the end casings 5 and 6, respectively.

My device consists, broadly, of a stationary portion 9 and a movable portion 10. The stationary portion 9 is mounted inside the end casing 5 and comprises a plate member 11 that is provided with screw holes 12 for fastening to the end casing 5 and a suitable opening 13 for the shaft 4 and the bearing member 7. The plate member 11 is also provided with bent or turned up portions 14 and 15 which are connected by a pin 16. A member 17, of irregular shape, has a pivotal support upon the pin 16 and comprises a curved portion 18 having a blade 19 which carries a pair of connected contact strips 20 that are insulated therefrom. Two stationary contact members 21 and 22 are mounted upon and insulated from a projecting member 23 that is integral with the plate member 11. The contact members 21 and 22 are connected by terminals 24 and 25 to any electrical circuit desired as, for example, the auxiliary starting winding (not shown) of the motor. The member 17 is provided with a projecting arm 26 which coacts with a lever 27 having a pivotal support at 28 upon the member 14 and being provided with an opening 29 to receive the arm 26 with a loose fit. A spring 30, having a curved face 41, is attached to a member 31 that is integral with the plate member 11 and is adapted to be engaged by the end of the arm 26.

The movable portion of the centrifugal switch comprises a plate member 32 that is fastened by screws 33 to the rotor 3 and is provided with a slot 34. A slidable member 35, which is mounted between the member 32 and the rotor 3, has a weighted arm 36 extending through the slot 34, the latter acting as a guide for the arm 36 as it moves outwardly under the action of centrifugal force. The member 35 is also provided with arms 37 having projections 38 which act as stops to limit the outward movement of the slidable member 35.

The operation of the switch will now be described. It may be assumed that the motor is at rest and that the various parts have the respective positions shown in the drawings. The contact strips 20 bridge the contact members 21 and 22 to connect the terminals 24 and 25. The motor may be started by any suitable means, and, as the speed increases, the arm 36 is moved outwardly by centrifugal force against the force of a spring 39. When a predetermined speed is reached, the arm 36 has moved outwardly a sufficient distance to strike the projecting lever 27 a sharp blow and thereby force it downwardly and outwardly on its pivot. The arm 26, which is in engagement with the lever 27, is actuated to turn the member 17 counterclockwise on the pin 16, as shown in Fig. 4. The blade 19, which is carried by the member 17, is rotated in the same direction with a quick movement to break the connection between the contact members 21 and 22 and open the circuit that is connected to the terminals 24 and 25. It will be noted that the movable member of the switch moves substantially parallel to the shaft 4 and at right angles to the plane of rotation. When the speed of the motor decreases to a predetermined minimum, the spring 39 has retracted the member 32 and the arm 36 inwardly until the latter is in a position to strike an inclined arm 40 that is integral with the member 17 and thereby rotate the latter in a clockwise direction (Fig. 4) to again connect the contact members 21 and 22. The spring 30 acts to accelerate the movement of the arm 26 when the latter passes the center of the curved surface 41 in either direction and a quick snap action of the member 17, and thereby of the blade 19, is insured.

It will be understood that such changes may be made in my invention as fall within the limits of the appended claims.

I claim as my invention:

1. The combination with a stationary switch having a pivotally mounted contact member and a plurality of projecting elements carried thereby, of a lever connected to one of said elements, said lever being movable in a plane normal to the plane of movement of said element, and means for actuating said lever and one of said elements to cause movement of said contact member in opposite directions, said means comprising a rotatable shaft and an element slidably mounted on said shaft.

2. The combination with a movable contact member and a plurality of projecting elements carried thereby, of a lever connected to one of said elements, means for actuating said lever and the other of said elements to cause movement of said contact member in opposite directions and resilient means for biasing the said lever-actuated element in different positions.

3. The combination with a movable contact member and a plurality of projecting elements carried thereby, of a lever connected to one of said elements, means for actuating said lever and the other of said elements to cause movement of said contact member in opposite directions and a spring interposed in the path of movement of said lever-actuated element for biasing it in different positions.

4. The combination with a stationary switch member having a pivotally mounted contact member and a plurality of projecting elements carried thereby, of a lever connected to one of said elements, the pivotal axis of which is at right angles to the pivotal axis of said member, and means for actuating said lever and one of said elements to cause movement of said contact member in opposite directions.

In testimony whereof, I have hereunto subscribed my name this 15th day of May, 1913.

HAROLD M. SCHEIBE.

Witnesses:
B. B. HINES,
M. C. MERZ.

Copies of this patent may be obtained for five cents each, by addressing the "Commissioner of Patents, Washington, D. C."